United States Patent
Yoshida et al.

(10) Patent No.: US 8,728,677 B2
(45) Date of Patent: May 20, 2014

(54) FUEL CELL SYSTEM AND FUEL CELL DEGRADATION JUDGMENT METHOD

(75) Inventors: Michio Yoshida, Miyoshi (JP); Kenji Umayahara, Miyoshi (JP)

(73) Assignee: Toyota Jidosha Kabushiki Kaisha, Toyota-Shi (JP)

(*) Notice: Subject to any disclaimer, the term of this patent is extended or adjusted under 35 U.S.C. 154(b) by 440 days.

(21) Appl. No.: 12/809,310

(22) PCT Filed: Dec. 11, 2008

(86) PCT No.: PCT/JP2008/072558
§ 371 (c)(1),
(2), (4) Date: Jun. 18, 2010

(87) PCT Pub. No.: WO2009/081755
PCT Pub. Date: Jul. 2, 2009

(65) Prior Publication Data
US 2010/0273071 A1 Oct. 28, 2010

(30) Foreign Application Priority Data
Dec. 20, 2007 (JP) ................................. 2007-328981

(51) Int. Cl.
*H01M 8/04* (2006.01)
(52) U.S. Cl.
USPC .......................................... 429/431; 429/432
(58) Field of Classification Search
USPC .................................................. 429/400–535
See application file for complete search history.

(56) References Cited

U.S. PATENT DOCUMENTS

| 6,586,123 B1 * | 7/2003 | Yi et al. ........................ 429/431 |
| 7,597,977 B2 * | 10/2009 | Hamada et al. ............... 429/465 |
| 2004/0106022 A1 * | 6/2004 | Saito et al. ...................... 429/22 |
| 2004/0124843 A1 * | 7/2004 | Hamada et al. ............... 324/434 |
| 2010/0092819 A1 | 4/2010 | Umayahara et al. |
| 2010/0227237 A1 | 9/2010 | Yoshida |

FOREIGN PATENT DOCUMENTS

| DE | 11 2008 001 579 T5 | 4/2010 | |
| JP | 09-027336 | * 1/1997 | ............. H01M 8/04 |
| JP | 2003-115318 A | 4/2003 | |
| JP | 2005-032587 A | 2/2005 | |
| JP | 2006-120375 A | 5/2006 | |
| JP | 2006-253096 A | 9/2006 | |

(Continued)

OTHER PUBLICATIONS

Machine English Translation of 09-027336 to Yajima et al.*

*Primary Examiner* — Carlos Barcena
*Assistant Examiner* — Michael Dignan
(74) *Attorney, Agent, or Firm* — Kenyon & Kenyon LLP

(57) ABSTRACT

Provided is a fuel cell system which can measure an air blow interval and consider an exceptional condition such as a high-potential-avoiding operation, thereby enabling an accurate judgment of degradation of an electrolyte. An actual air blow time interval is measured while estimating a theoretical air blow time interval when an increase of a hydrogen consumption amount corresponding to a cell voltage in the high-potential-avoiding operation according to an output current by using a relationship table which contains a record of a relationship between a hydrogen consumption amount consumed for maintaining the function of a fuel cell and the air supply time interval varying with the increase of the hydrogen consumption amount. The degradation of the electrolyte of the fuel cell is judged according to whether the measured actual air blow time interval is shorter than the theoretical air blow time interval corresponding to the hydrogen consumption amount.

7 Claims, 8 Drawing Sheets

(56) References Cited

FOREIGN PATENT DOCUMENTS

| JP | 2006253096 | A | * | 9/2006 |
| JP | 2006-294447 | A | | 10/2006 |
| JP | 2006294447 | A | * | 10/2006 |
| JP | 2007-103023 | A | | 4/2007 |
| JP | 2007-109569 | A | | 4/2007 |
| JP | 2007109569 | A | * | 4/2007 |

* cited by examiner

FUEL CELL SYSTEM AND FUEL CELL DEGRADATION JUDGMENT METHOD

This is a 371 national phase application of PCT/JP2008/072558 filed 11 Dec. 2008, which claims priority to Japanese Patent Application No. 2007-328981 filed 20 Dec. 2007, the contents of which are incorporated herein by reference.

FIELD OF THE INVENTION

The present invention relates to a fuel cell system. More particularly, it relates to a fuel cell system which judges the degradation of an electrolyte of a fuel cell based on an air supply amount.

BACKGROUND OF THE INVENTION

When a fuel cell system is operated for a long period of time, an electrolyte of a fuel cell stack degrades, an electrolyte membrane cracks, and differential pressure resistant properties lower, thereby causing cross leak sometimes. To solve this problem, heretofore, a system for detecting the occurrence of the cross leak has been developed. For example, Japanese Patent Application Laid-Open No. 2006-120375 discloses a fuel cell system in which when the concentration of hydrogen in air discharged from a fuel cell stack is not less than a predetermined value, it is judged that cross leak has occurred, to urgently stop a fuel cell (Patent Literature 1).

Moreover, another system has been developed in which during light loading or during idling, the power generation voltage of the fuel cell might rise to promote the degradation of the fuel cell, and hence the rise of the power generation voltage of a fuel cell is suppressed, thereby suppressing the degradation of the fuel cell (hereinafter processing to prevent the voltage of the fuel cell from rising to a constant value or more will be referred to as the "high-potential-avoiding processing"). For example, Japanese Patent Application Laid-Open No. 2007-109569 discloses still another fuel cell system in which as means for suppressing the degradation of a fuel cell by the high-potential-avoiding processing, an air compressor is operated so that a cell voltage is not more than a beforehand set predetermined upper limit voltage, and is controlled to intermittently supply air to a fuel cell stack (Patent Literature 2).

Furthermore, for example, Japanese Patent Application Laid-Open No. 2007-103023 discloses a further fuel cell system in which as a measure for preventing cross leak from occurring at the stop of the system, a technology is used to dispose of hydrogen crossing over an anode and accumulated in a cathode when the system is left to stand after the stop. At the start of a fuel cell, an oxidant gas is supplied under pressure until a predetermined pressure is obtained, and the gas is sealed between a shut valve and an air pressure regulation valve, whereby hydrogen present in a cathode path is burnt and treated on a catalyst in the cathode (Patent Literature 3).

In addition, there is another technology in which when the electrolyte membrane degrades owing to the adsorption of oxygen, the output voltage of the fuel cell is lowered while suppressing the supply of air, to operate the fuel cell in a reduction region, thereby activating a catalyst layer (this processing will hereinafter be referred to as the "catalyst activation processing"). As a technology concerned with such catalyst activation processing of the fuel cell, for example, Japanese Patent Application Laid-Open No. 2003-115318 discloses a technology in which a cell voltage is set to 0.6 V or less, and a large current is allowed to flow to cause a reducing reaction in oxygen, thereby activating a platinum catalyst layer (Patent Literature 4).

Moreover, if the amount of water included in cells constituting the fuel cell is not controlled in an appropriate range, the cells excessively dry, or a wet degree thereof is excessively high, thereby accelerating the degradation of the cells. To solve the problem, Japanese Patent Application Laid-Open No. 2005-32587 discloses a technology in which a relationship between the water content state of the cells and the open circuit voltage thereof is utilized. When the open circuit voltage of the cells is lower than a first threshold voltage, it is judged that the cells have a dry state. When the open circuit voltage is higher than a second threshold voltage, it is judged that the cells have an excessive water state, and the water content state of the cells is appropriately controlled (Patent Literature 5).

Here, especially when a cell voltage is excessively low, the cells degrade noticeably. Therefore, the minimum lower limit voltage of the cells, below which the cell voltage should not be, is set. If the cell voltage is below this minimum lower limit voltage, a predetermined amount of air is preferably supplied to raise the voltage (this processing will hereinafter be referred to as the "cell voltage lowering prevention processing").

Patent Literature 1: Japanese Patent Application Laid-Open No. 2006-120375 (Paragraphs 0053 and 0054, etc.)
Patent Literature 2: Japanese Patent Application Laid-Open No. 2007-109569 (Paragraphs 0044 and 0045, etc.)
Patent Literature 3: Japanese Patent Application Laid-Open No. 2007-103023 (Paragraphs 0037 to 0044, etc.)
Patent Literature 4: Japanese Patent Application Laid-Open No. 2003-115318 (Paragraphs 0012 to 0014, etc.)
Patent Literature 5: Japanese Patent Application Laid-Open No. 2005-32587 (Paragraphs 0040 to 0058, etc.)

SUMMARY OF INVENTION

Problem to be Solved by Invention

However, a hydrogen concentration sensor used in a cross leak detection method described above in Patent Literature 1 is an expensive sensor, and hence the occurrence of cross leak is preferably estimated by another element instead of the direct cross leak detection using the hydrogen concentration sensor.

The present invention has been developed to solve the above problem, and an object thereof is to provide a fuel cell system which can correctly detect the occurrence of cross leak based on an air supply amount to accurately judge the degradation of an electrolyte without using any expensive sensor.

Solution to Problem

Here, in the above cell voltage lowering prevention processing, when electrolyte membranes of cells degrade to cause cross leak, as compared with the supply amount of a reactant gas (e.g., an oxidizing gas) required for the cell voltage lowering prevention processing, the consumption amount of the reactant gas tends to increase. Therefore, it is considered that to solve the above problem, the supply amount of the reactant gas to be measured can be monitored in comparison with the supply amount of the oxidizing gas at a normal time, thereby detecting the occurrence of cross leak. The supply amount of the reactant gas has a correlation with the frequency (interval) of reactant gas supply processing, and hence the supply amount of the reactant gas can be judged based on the frequency of the reactant gas supply processing to estimate the occurrence of the cross leak.

However, the supply amount of the reactant gas does not correspond only to the occurrence amount of the cross leak, but is an element which also varies in accordance with the operating situation of a system. Therefore, the occurrence of the cross leak cannot correctly be detected based on the supply amount of the reactant gas or the frequency of the reactant gas supply processing.

Therefore, the present inventor has thought upon the invention which can accurately detect the occurrence of the cross leak based on the supply amount of the reactant gas as follows.

A fuel cell system of the present invention is a fuel cell system which judges the degradation of an electrolyte membrane of a fuel cell based on the flow rate of a reactant gas supplied to the fuel cell during the intermittent operation of the fuel cell, wherein the degradation of the electrolyte membrane of the fuel cell is judged in consideration of the flow rate of the reactant gas supplied for the intermittent operation and the flow rate of the reactant gas consumed to maintain the function of the fuel cell.

According to such a constitution, in addition to the flow rate of the reactant gas necessary for the intermittent operation, the influence of the flow rate of the reactant gas consumed to maintain the function of the fuel cell is considered to judge the presence/absence of cross leak, thereby enabling the accurate detection of the occurrence of the cross leak and enabling the accurate detection of the degradation of an electrolyte.

Here, the "intermittent operation" is an operation or a mode to intermittently stop the power generation of the fuel cell for a predetermined period of time owing to various situations in a period from power source on to power source off of the fuel cell system.

Moreover, "to maintain the function" means a purpose other than a purpose of obtaining the necessary generated power obtained for a system demand. Specific examples of the purpose include the maintaining of durability, safety, performance and the like of the fuel cell.

Here, the "reactant gas" conceptually includes both the oxidizing gas (air) and a fuel gas (a hydrogen gas), and the consumption amount of the oxidizing gas has a correlation with that of the fuel gas, whereby one or both of the consumption amounts can be used as a parameter for the judgment of the degradation.

For example, the reactant gas consumed to maintain the function of the fuel cell is the oxidizing gas consumed for high-potential-avoiding processing in the fuel cell.

In the high-potential-avoiding processing for preventing the fuel cell from being degraded, the oxidizing gas is periodically supplied so that the output voltage of the fuel cell does not rise above a predetermined threshold value. The oxidizing gas supplied for this high-potential-avoiding processing maintains the function of the fuel cell, and is not consumed by the occurrence of the cross leak. According to such a constitution, in addition to the flow rate of the oxidizing gas required for the intermittent operation, the flow rate of the oxidizing gas for the high-potential-avoiding processing is supposed to increase, thereby enabling the correct detection of the occurrence of the cross leak.

Moreover, in the fuel cell system, for example, the reactant gas consumed to maintain the function of the fuel cell is the oxidizing gas supplied when ending the catalyst activation processing of the electrolyte membrane.

In the catalyst activation processing to reduce the catalyst oxidized in cells constituting the fuel cell, the supply amount of the oxidizing gas is reduced to lower the power generation voltage, and an electrochemical reaction is allowed to occur in a reduction region, whereby after the catalyst activation processing, the oxidizing gas needs to be temporarily supplied, thereby returning to a usual operation mode. The oxidizing gas supplied immediately after this catalyst activation processing is also the reactant gas for maintaining the function of the fuel cell, and is not consumed by the occurrence of the cross leak. In consequence, according to such a constitution, the flow rate of the oxidizing gas can be judged with the exclusion of the oxidizing gas necessary at the end of the catalyst activation processing which is one configuration of the fuel cell function maintaining processing, thereby enabling the accurate detection of the degradation of the electrolyte.

Here, the fuel cell system may comprise means for supplying the predetermined amount of the oxidizing gas when the cell voltage of the fuel cell reaches a predetermined lower limit voltage; means for measuring the actual time interval of the supply of the oxidizing gas; and degradation judgment means for judging the degradation of the fuel cell based on the measured actual time interval of the supply of the oxidizing gas and the theoretical time interval of the supply of the oxidizing gas when the electrolyte membrane of the fuel cell is normal.

According to such a constitution, the oxidizing gas is periodically supplied as the reactant gas for cell voltage lowering prevention processing, but the ideal time interval of the supply of the oxidizing gas when the electrolyte membrane of the fuel cell is normal must have been substantially equal to the actually measured actual time interval. However, when the cross leak occurs, the consumption amount of the oxidizing gas increases, and the time interval of the supply of the oxidizing gas shortens, thereby enabling the detection of the occurrence of the cross leak. Therefore, instead of a hydrogen concentration sensor or a reactant gas flow rate sensor, the time interval of the supply of the oxidizing gas can be used, and hence the degradation of the electrolyte can be detected by cost effective means.

Moreover, in the fuel cell system, the means for measuring the actual time interval of the supply of the oxidizing gas preferably measures the actual time interval of the supply of the oxidizing gas with the exclusion of the supply of the oxidizing gas immediately after the catalyst activation processing, when the actual time interval of the supply of the oxidizing gas is measured.

The supply of the oxidizing gas immediately after the end of the catalyst activation processing is exceptional oxidizing gas supply processing which accompanies exceptional processing such as the catalyst activation processing. Therefore, according to such a constitution, when the actual time interval of the supply of the oxidizing gas is measured, the oxidizing gas supply processing immediately after the catalyst activation processing is excluded, thereby enabling the accurate and cost effective detection of the degradation of the electrolyte.

Furthermore, the fuel cell system further comprises a relationship table which contains a record of a relationship between the consumption amount of the fuel gas of the fuel cell and the theoretical time interval of the supply of the oxidizing gas varying with the increase of the consumption amount of the fuel gas; means for estimating the consumption amount of the fuel gas based on the output current of the fuel cell; and means for acquiring the theoretical time interval of the supply of the oxidizing gas corresponding to the consumption amount of the fuel gas estimated with reference to the relationship table, characterized in that the degradation judgment means judges the degradation of the electrolyte of the fuel cell based on whether or not the measured actual time interval of the supply of the oxidizing gas is shorter than the theoretical time interval of the supply of the oxidizing gas corresponding to the acquired consumption amount of the fuel gas.

When the amount of the power to be generated by the fuel cell increases owing to a measure for maintaining the function of the fuel cell, the consumption amount of the fuel gas increases, and the consumption amount of the oxidizing gas accordingly increases. According to such a constitution, the relationship table contains a record of the consumption amount of the oxidizing gas corresponding to the consumption amount of the fuel gas at the normal time, that is, the theoretical time interval of the supply of the oxidizing gas. Therefore, even in a case where the consumption amount of the fuel gas for maintaining the function increases and the actual time interval of the supply of the oxidizing gas accordingly shortens, with reference to the relationship table, it is possible to acquire the theoretical time interval of the supply of the oxidizing gas in a case where the consumption amount of the fuel gas increases. The theoretical time interval can be compared with the measured actual time interval of the supply of the oxidizing gas to correctly judge the presence/absence of the occurrence of the cross leak.

Moreover, in the present invention, the amount of the oxidizing gas obtained by subtracting the amount of the reactant gas consumed to maintain the function from the amount of the reactant gas supplied for the intermittent operation may be estimated as the amount of the cross leak in the electrolyte membrane of the fuel cell.

In the present invention, it is simply considered that there is a relationship of $Q \approx Q1+Q2$, in which $Q$ is the amount (the total amount) of the reactant gas supplied for the intermittent operation, $Q1$ is the amount of the reactant gas consumed to maintain the function, and $Q2$ is the amount of the cross leak occurring in the electrolyte membrane of the fuel cell. Therefore, in a case where the amount $Q2$ of the reactant gas consumed to maintain the function is directly obtained by detection means such as a sensor or indirectly obtained through calculation for estimation by a computer, the cross leak amount $Q2$ can be estimated by the calculation of $Q2 \approx Q-Q1$.

A degradation judgment method of a fuel cell of the present invention is a degradation judgment method of a fuel cell which judges the degradation of an electrolyte membrane of the fuel cell based on the amount of a reactant gas supplied to the fuel cell during the intermittent operation of the fuel cell, the method comprising: a step of measuring the amount of the reactant gas supplied for the intermittent operation; a step of measuring the amount of the reactant gas consumed to maintain the function of the fuel cell; and a step of judging the degradation of the electrolyte membrane of the fuel cell based on the amount of the reactant gas supplied for the intermittent operation and the amount of the reactant gas consumed to maintain the function of the fuel cell.

A degradation judgment method of a fuel cell of the present invention comprises: a step of supplying a predetermined amount of an oxidizing gas in a case where the cell voltage of the fuel cell reaches a predetermined lower limit voltage; a step of measuring the actual time interval of the supply of the oxidizing gas; and a step of judging the degradation of the fuel cell based on the measured actual time interval of the supply of the oxidizing gas and the theoretical time interval of the supply of the oxidizing gas in a case where the electrolyte membrane of the fuel cell is normal.

Advantageous Effects of Invention

According to the present invention, the degradation of an electrolyte membrane of a fuel cell is judged in consideration of the flow rate of a reactant gas supplied during an intermittent operation and the flow rate of the reactant gas consumed to maintain the function of the fuel cell, thereby enabling the correct detection of the occurrence of cross leak based on the supply amount of the reactant gas and enabling the accurate judgment of the degradation of an electrolyte, without using any expensive sensor.

DETAILED DESCRIPTION

Next, preferable embodiments for performing the present invention will be described in order of Embodiment 1 and Embodiment 2 with reference to the drawings. In the following embodiments, the present invention is applied to a hybrid fuel cell system mounted in an electric car. Moreover, the embodiments are merely the illustration of the configuration of the application of the present invention, and do not limit the present invention.

Embodiment 1

Figure 1:
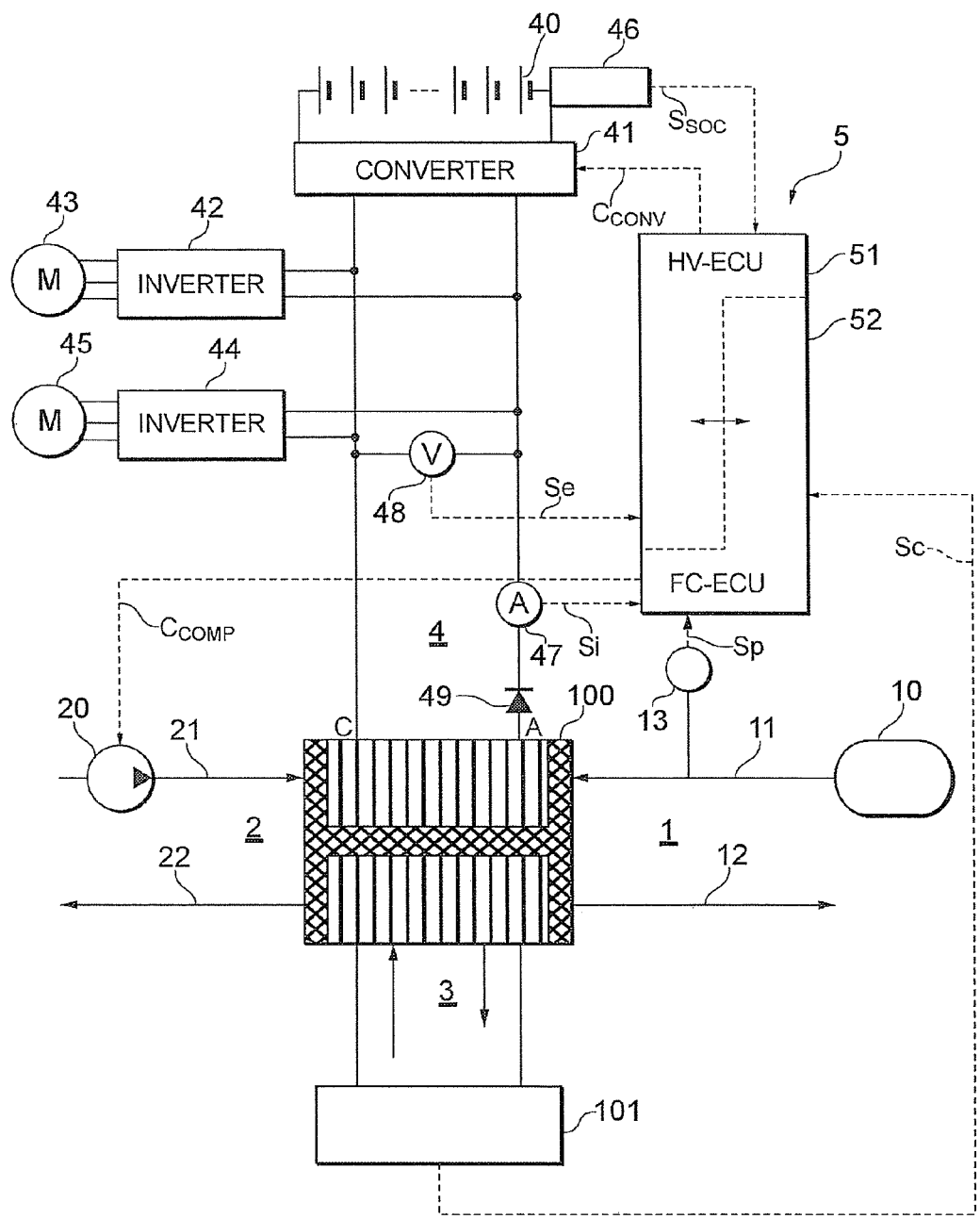
FIG. 1 is a constitution diagram showing the whole constitution of a fuel cell system according to Embodiment 1 of the present invention.

FIG. 1 is a constitution diagram showing the whole constitution of a fuel cell system according to a first embodiment of the present invention.

As shown in FIG. 1, the fuel cell system according to the present embodiment is constituted of a fuel gas supply system 1 which supplies a fuel gas (an anode gas and a hydrogen gas) to a fuel cell 100 described later; a cathode gas supply system 2 which supplies an oxidizing gas (a cathode gas and air) to the fuel cell 100; a power system 4; and a control unit 5 (control means) which performs necessary control. The fuel gas and the oxidizing gas will generically be referred to as a reactant gas.

The fuel cell 100 comprises a stack structure in which a plurality of cells (unitary cells) are stacked. Each cell has a structure in which a power generator referred to as a membrane electrode assembly (MEA) is sandwiched between a pair of separators having passages of the fuel gas, the oxidizing gas and cooling water. The MEA has a structure in which a polymer electrolyte membrane is sandwiched between two electrodes of an anode and a cathode. The anode has a constitution in which a catalyst layer for a fuel pole is provided on a porous support layer, and the cathode has a constitution in which a catalyst layer for an air pole is provided on a porous support layer. Additionally, as the configuration of the fuel cell, a phosphoric acid type, a melted carbonate type or the like can be used. The catalyst layers of these electrodes have a constitution obtained by attaching, for example, platinum particles.

The fuel cell 100 causes the backward reaction of the electrolysis of water, and hydrogen is supplied as the fuel gas from the fuel gas supply system 1 to an anode (cathode) side. Air as the oxidizing gas including oxygen is supplied from the oxidizing gas supply system 2 to a cathode (anode) side. A reaction of formula (1) occurs on the anode side, and a reaction of formula (2) occurs on the cathode side, to circulate electrons, thereby allowing a current to flow.

$$H_2 \rightarrow 2H^+ + 2e^- \quad (1)$$

$$2H^+ + 2e^- + (\tfrac{1}{2})O_2 \rightarrow H_2O \quad (2)$$

The fuel gas supply system 1 comprises a hydrogen tank 10 as a hydrogen gas supply source; a fuel gas supply path 11; a fuel off-gas discharge path 12; and a fuel gas pressure sensor 13 which measures the gas pressure of the hydrogen gas to detect the cross leak of the hydrogen gas. In addition, the fuel gas supply system may comprise a hydrogen pump for circulating the hydrogen gas, and a main valve, a regulation valve, a shutoff valve, a check valve, a gas-liquid separator and the like necessary for the management/control of the hydrogen gas (not shown).

A high pressure hydrogen gas is charged into the hydrogen tank 10. As the hydrogen supply source, in addition to the high pressure hydrogen tank, various sources such as a hydrogen tank using a hydrogen storing alloy, a to hydrogen supply mechanism by a reforming gas, a liquid hydrogen tank and a liquefied fuel tank can be applied. The fuel gas supply path 11 is a piping line which supplies the high pressure hydrogen gas, and may comprise a pressure regulation valve (the regulator) halfway (not shown). In the fuel cell 100, the hydrogen gas supplied from the fuel gas supply path 11 is supplied to the anode side of each unitary cell through a manifold, causes an electrochemical reaction in the anode of the MEA, and is then discharged as a fuel off-gas (a hydrogen off-gas). The fuel off-gas discharge path 12 is a path through which the fuel off-gas discharged from the fuel cell 100 is discharged, and may be provided with a circulation path. The circulation path has a constitution in which the fuel off-gas is again returned to the fuel gas supply path 11 through a check valve or an ejector (not shown).

The oxidizing gas supply system 2 comprises a compressor 20, an oxidizing gas supply path 21 and an oxidizing off-gas discharge path 22. Additionally, the system may comprise a humidifier which controls the humidity of the air as the oxidizing gas, a gas-liquid separator which removes an oxidizing off-gas (an air off-gas), a diluter for mixing the oxidizing off-gas with the fuel off-gas, a muffler and the like, although they are not shown in FIG. 1.

The compressor 20 compresses air taken from an air cleaner or the like based on a control signal $C_{COMP}$, and varies an air amount or an air pressure, to supply the air to the cathode side of the fuel cell 100. The air supplied from the oxidizing gas supply path 21 in the fuel cell 100 is supplied to the cathode side of each unitary cell through a manifold in the same manner as in the hydrogen gas, causes an electrochemical reaction in the cathode of the MEA, and is then discharged as the oxidizing off-gas. The oxidizing off-gas discharged from the fuel cell 100 is diluted and discharged together with the fuel off-gas.

The power system 4 comprises a battery 40, a DC-DC converter 41, a traction inverter 42, a traction motor 43, an auxiliary machine inverter 44, a high pressure auxiliary machine 45, a battery computer 46, a current sensor 47, a voltage sensor 48 which measures the output voltage of the fuel cell, a counter flow prevention diode 49 and the like.

The battery 40 is a chargeable/dischargeable secondary cell. As the battery, various types of secondary cells, for example, a nickel-hydrogen battery may be used. Instead of the secondary cell, a chargeable/dischargeable accumulator such as a capacitor may be used. In the battery 40, a plurality of battery units for generating a power at a constant voltage can be stacked and connected in series, to output a high voltage.

The battery computer 46 is provided at an output terminal of the battery 40, and can communicate with a control unit 3. The battery computer 46 monitors the state of charge of the battery 40, keeps an adequate charging range so that the battery is not overcharged nor over-discharged, and notifies the control unit 3, if the battery has a state such as an over-charge state or an over-discharge state.

The DC-DC converter 41 corresponds to power conversion means for raising or lowering the voltage between a primary side and a secondary side based on a control signal $C_{CONV}$ to circulate a power. For example, the output voltage of the battery 40 on the primary side is raised up to the output voltage of the fuel cell 100 on the secondary side, and the power is supplied to a load device such as the traction motor 43 or the high pressure auxiliary machine 45. On the contrary, the surplus power of the fuel cell 100 or a regenerative power from the load device is lowered on the secondary side, and is passed to charge the battery 40 on the primary side.

The traction inverter 42 converts a direct current into a three-phase alternate current to supply the current to the traction motor 43. The traction motor 43 is, for example, a three-phase motor, and is a main power source for a car in which the fuel cell system is mounted.

The auxiliary machine inverter 44 is direct current-alternate current conversion means for driving the high pressure auxiliary machine 45. The high pressure auxiliary machine 45 comprises various types of motors necessary for the operation of the fuel cell system, for example, the motors for the compressor 20, a hydrogen pump and a cooling system.

The current sensor 47 detects the output current of the fuel cell 100, and outputs a current detection signal Si to the control unit 5. The voltage sensor 48 detects the output voltage of the fuel cell 100, and outputs a voltage detection signal Se to the control unit 5. A cell monitor 101 detects the cell voltage of a part or all of the cells of the fuel cell 100, and outputs a cell voltage detection signal Sc to the control unit 5.

The control unit 5 is constituted of two control units, one of them is an HV control unit 51 which controls hybrid running, and the other control unit is an FC control unit 52 which controls the operation of the fuel cell. Each of the control units comprises a constitution of a multi-purpose computer including a central processing unit (CPU), an RAM, an ROM, an interface circuit and the like, and mutual communication enables the control of the whole system. The HV control unit 51 successively executes a software program stored in an internal ROM or the like, to mainly control the power system 4. In particular, the HV control unit 51 controls power circulation among these elements in view of the generated power of the fuel cell 100, the charge power of the battery 40 and the consumption power of various motors. Additionally, cell voltage lowering prevention processing, high-potential-avoiding processing and a part of catalyst layer activation processing can be executed. Moreover, the FC control unit 52 successively executes the software program stored in the internal ROM or the like to control the whole fuel cell system mainly including the anode gas supply system 1 and the cathode gas supply system 2. Additionally, a part of the activation processing of the catalyst layer can be executed.

Figure 2:
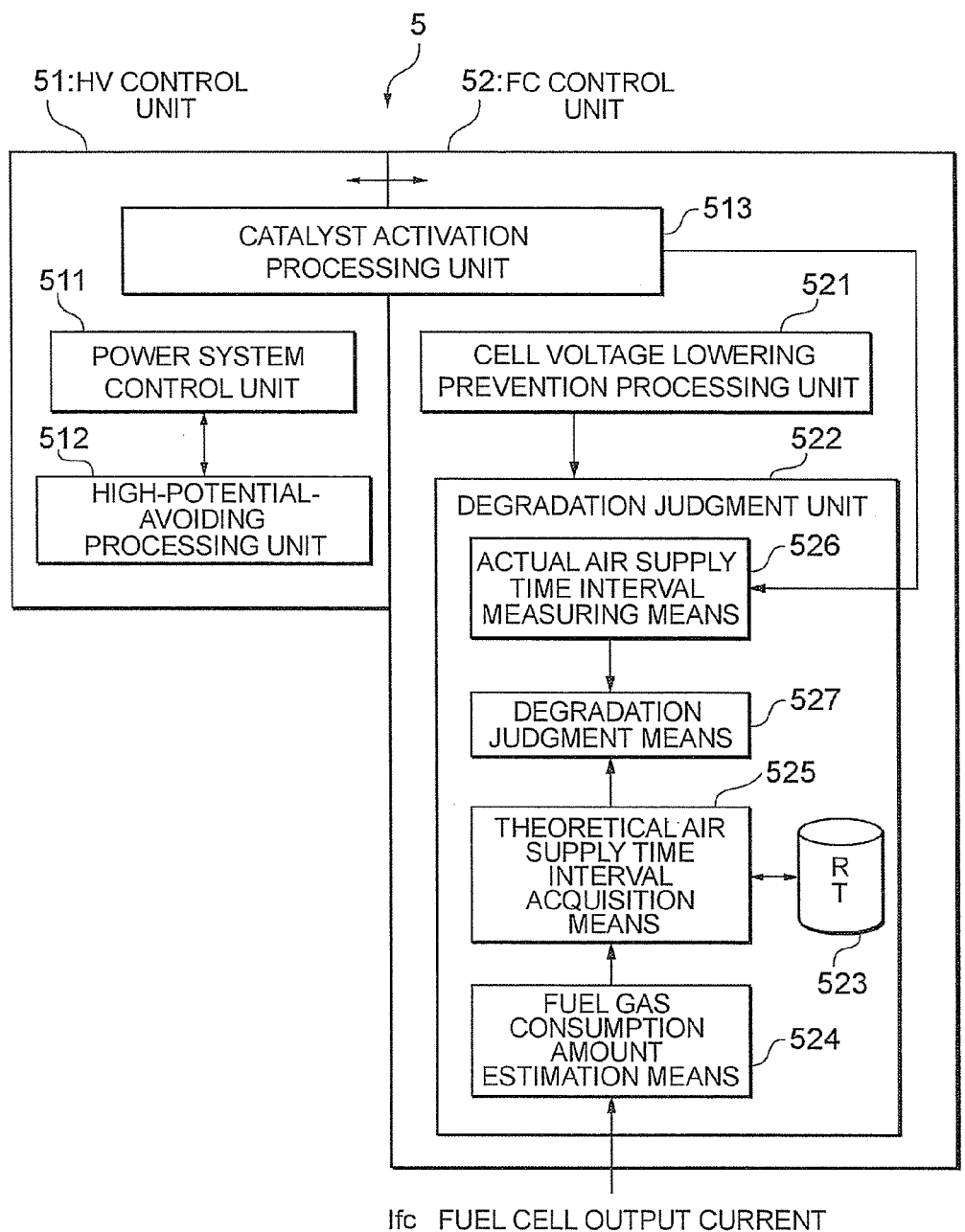
FIG. 2 is a constitution diagram showing the constitution of functional blocks in a control unit 5 of the fuel cell system according to Embodiment 1 of the present invention.

FIG. 2 is a constitution diagram showing the constitution of functional blocks in the control unit 5 of the fuel cell system according to the first embodiment of the present invention.

As shown in FIG. 2, the control unit 5 is divided into the HV control unit 51 and the FC control unit 52 as described above. The HV control unit 51 comprises a power system control unit 511, a high-potential-avoiding processing unit 512 and a part of a catalyst activation processing unit 513. The FC control unit 52 comprises a cell voltage lowering prevention processing unit 521, a degradation judgment unit 522 according to the present invention, and a part of the catalyst activation processing unit 513.

The power system control unit 511 is a functional block which controls the whole power circulation in the fuel cell 100, the battery 40, various motors and the like. Detection signals from various sensors are input to determine load distribution between the fuel cell 100 and the battery 40, and the control of the charging into the battery 40 in the case of the supply of the regenerative power or the like is performed.

The high-potential-avoiding processing unit 512 is a functional block which performs the high-potential-avoiding processing. Specifically, the high-potential-avoiding processing unit 512 judges whether or not an output voltage Vfc or a cell voltage Vc of the fuel cell 100 exceeds a predetermined high-potential-avoiding voltage threshold value with reference to the voltage detection signal Se supplied from the voltage sensor 48 and/or the cell voltage detection signal Sc supplied from the cell monitor 101. When the voltage exceeds the high-potential-avoiding voltage threshold value, a control signal SCONV is output to the DC-DC converter 41 to lower a secondary side voltage, that is, the output voltage of the fuel cell 100. Moreover, the high-potential-avoiding processing unit outputs, to the compressor 20, the control signal CCOMOP for supplying air to compensate for the amount of the generated power which increases in accordance with the lowering of the output voltage of the fuel cell.

The catalyst activation processing unit 513 is a functional block which performs catalyst activation processing. Specifically, on predetermined conditions that a low efficiency operation such as an intermittent operation is performed, the catalyst activation processing unit 513 limits the supply of the oxidizing gas and the fuel gas periodically or in a case where it can be judged from the cell voltage Vc or the like that the oxidation of the catalyst of the electrolyte membrane is proceeding. Moreover, the secondary side voltage of the DC-DC converter 41 is gradually lowered to a catalyst activation target voltage, to keep the proceeding state of the electrochemical reaction in the reduction region of the catalyst, thereby activating the catalyst (also referred to as refreshing). The catalyst activation target voltage is kept for a constant time, and then the DC-DC converter 41 is controlled to restore the secondary side voltage to the original voltage. At this time, the compressor 20 is controlled to compensate for the oxidizing gas which runs short owing to the catalyst activation processing, thereby supplying the constant amount of the oxidizing gas for a period of time (this processing will hereinafter be referred to as "air blow").

The cell voltage lowering prevention processing unit 521 is a functional block which performs the cell voltage lowering prevention processing. Specifically, the cell voltage lowering prevention processing unit 521 judges whether or not the cell voltage is below a predetermined minimum lower limit voltage during the intermittent operation with reference to the cell voltage detection signal Sc from the cell monitor 101. Moreover, when the cell voltage is below the minimum lower limit voltage, the compressor 20 is driven for a constant time to supply the constant amount of the oxidizing gas (air blow), thereby raising the cell voltage. The supply of the reactant gas is stopped in principle during the intermittent operation, and the cell voltage lowers when the oxidizing gas runs short with the elapse of the constant time after the air blow, whereby the air blow is required again. That is, the cell voltage lowering prevention processing unit 521 periodically performs the air blow during the intermittent operation.

The degradation judgment unit 522 is a functional block which judges the degradation of the electrolyte membrane of the fuel cell 100 in consideration of both the flow rate of the oxidizing gas supplied during the intermittent operation and the flow rate of the oxidizing gas consumed to maintain the function of the fuel cell 100 according to the present invention. Specifically, the degradation judgment unit 522 comprises a relationship table 523, fuel gas consumption amount estimation means 524, theoretical air supply time interval acquisition means 525, actual air supply time interval measuring means 526 and degradation judgment means 527.

The relationship table 523 is a table which contains a record of a relationship between the consumption amount of the fuel gas (the supply amount of the fuel gas required during the intermittent operation) and the theoretical air supply time interval varying with the increase of the fuel gas consumption amount (hereinafter referred to also as the "theoretical time interval"), and is stored in a storage section of the control unit 5. For example, when the supply amount of the fuel gas is specified by the number of moles and the air supply time interval (the interval of the air blow) can be grasped by the number of seconds, the relationship table 523 regulates a relationship of the number of the seconds, which is the air supply time interval, with respect to the number of the moles of the fuel gas (see FIG. 4).

The fuel gas consumption amount estimation means 524 is a functional block which estimates the fuel gas consumption amount per unit time during the intermittent operation based on an output current Ifc of the fuel cell 100 detected on the basis of the detection signal Si supplied from the current sensor 47. Here, the fuel gas consumption amount estimated by the fuel gas consumption amount estimation means 524 is the whole fuel gas consumption amount estimated from the output current of the fuel cell, and includes both the consumption amount of the fuel gas necessary for the intermittent operation and the consumption amount of the fuel gas which increases during the execution of the high-potential-avoiding processing.

The theoretical air supply time interval acquisition means 525 is a functional block which acquires the theoretical air supply time interval corresponding to the fuel gas consumption amount estimated by the fuel gas consumption amount estimation means 524 with reference to the relationship table 523. The theoretical air supply time interval acquired corresponding to the fuel gas consumption amount reflects the increase of the consumption amount of the oxidizing gas for maintaining the function of the fuel cell in the high-potential-avoiding processing or the like.

The actual air supply time interval measuring means 526 is a functional block which measures the interval of the air blow performed under the control of the cell voltage lowering prevention processing unit 521, that is, the actual air supply time interval (hereinafter referred to also as "the actual time interval"). Here, the actual air supply time interval measuring means 526 compares the time interval with the time interval of the air blow corresponding to the fuel gas consumption amount with the exclusion of the air blow immediately after the end of the catalyst activation processing from the actually executed air blow. This will be described in detail later in Embodiment 2.

The degradation judgment means 527 is a functional block which considers that the actual supply time interval of the air supply measured by the actual air supply time interval measuring means 526 corresponds to the fuel gas consumption amount, and judges whether or not the time interval is shorter than the theoretical air supply time interval acquired by the theoretical air supply time interval acquisition means 525, to judge the degradation of the electrolyte of the fuel cell 100.

(Description of Operation)

Next, the operation of the processing to judge the degradation of the electrolyte of the fuel cell stack will be described in the fuel cell system according to the present embodiment.

Figure 3:
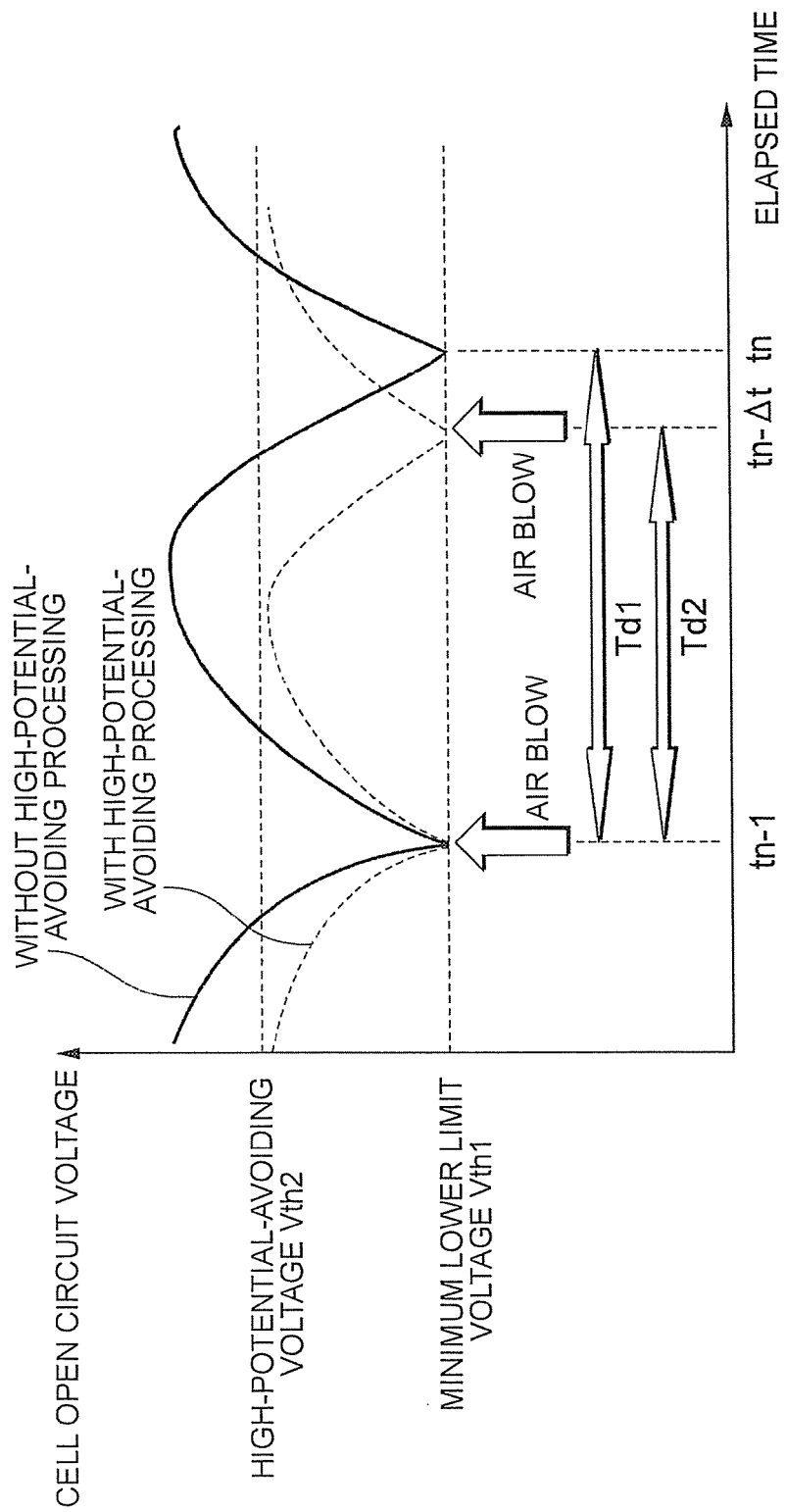
FIG. 3 is a graph diagram showing a relationship between an air blow interval and a cell voltage.

FIG. 3 shows a relationship between the interval of the air blow executed by the cell voltage lowering prevention processing and a cell open circuit voltage during the intermittent operation.

As shown in FIG. 3, the fuel cell system sets a minimum lower limit voltage Vth1, below which the cell voltage should not be, for the cell voltage lowering prevention processing. The cell voltage lowering prevention processing unit 521 monitors the cell voltage Vc detected by the cell monitor 101, and executes the air blow for a predetermined time when the cell voltage Vc reaches the minimum lower limit voltage Vth1. When the air blow is executed, the oxidizing gas is supplied to temporarily recover the cell voltage Vc. However, when the oxidizing gas starts running short again after the air blow, the cell voltage Vc starts lowering. When the cell voltage reaches the minimum lower limit voltage Vth1, the air blow is executed again. It is considered that the time interval of the air blow corresponds to the consumption amount of the oxidizing gas necessary for the intermittent operation as long as the oxidizing gas is not excessively consumed to maintain the function of the fuel cell, and the consumption amount of the oxidizing gas also corresponds to the consumption amount of the fuel gas owing to the relationships of the above formulas (1) to (3). Therefore, when the consumption amount of the fuel gas can be grasped, the supply amount of the fuel gas, that is, the theoretical time interval of the air blow (the theoretical time interval) can be grasped. The fuel gas consumption amount can be calculated from the output current of the fuel cell 100 based on the relationships of the above formulas (1) to (3). The relationship table 523 contains a record of the theoretical air blow time interval Tc obtained from the supply amount of the oxidizing gas required for the consumption amount of the fuel gas.

Figure 4:
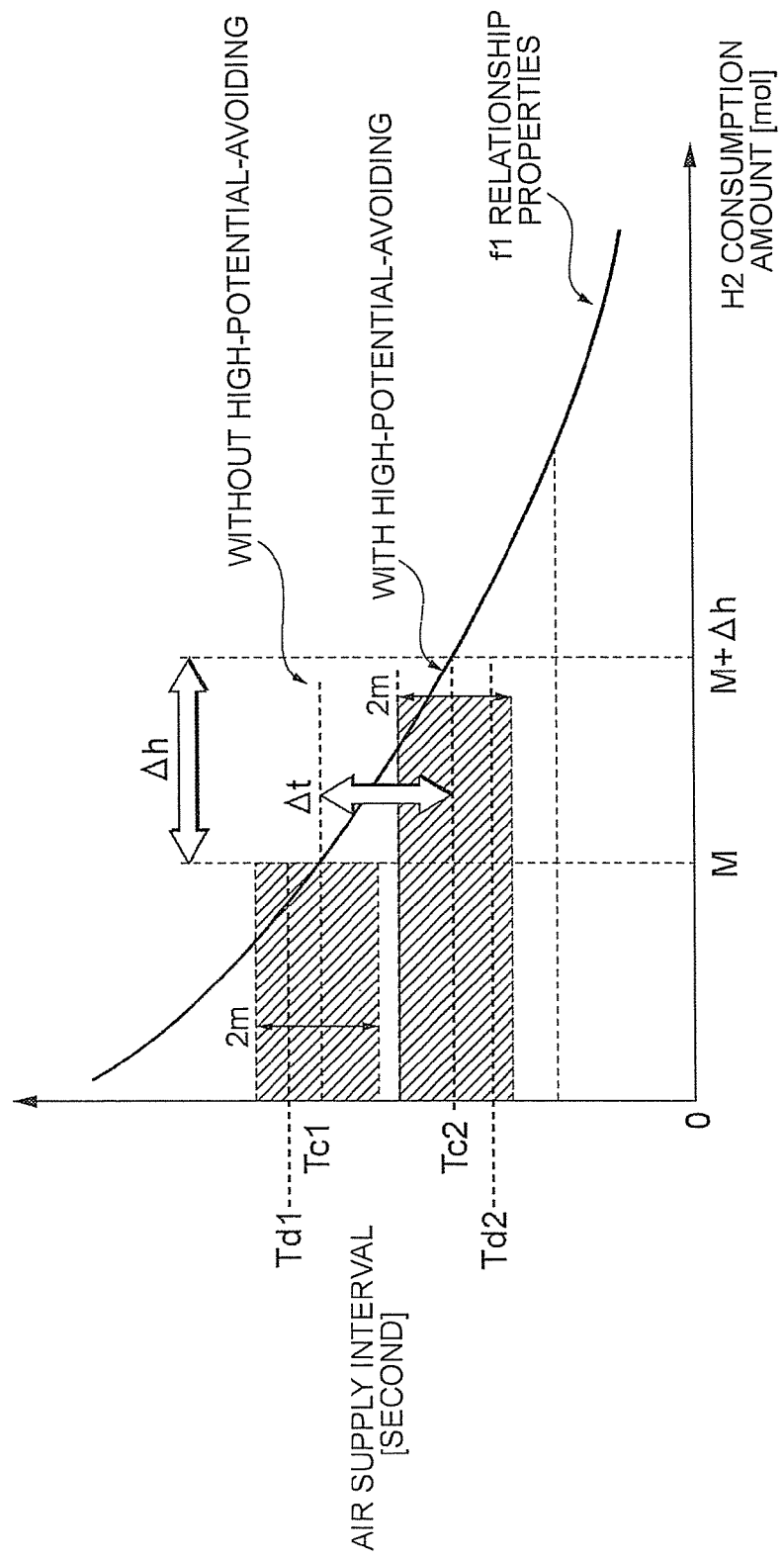
FIG. 4 is a graph diagram showing the properties of a relationship between a fuel gas consumption amount estimated from a power generation current and a theoretical air supply time interval.

FIG. 4 shows a relationship between a fuel gas (hydrogen) consumption amount estimated from a power generation current and the theoretical air supply time interval, as recorded in the relationship table 523. A solid line shows relationship properties f1 between the fuel gas consumption amount and the theoretical air supply time interval in a case where the oxidizing gas is supplied only for the intermittent operation.

In the fuel cell system according to the present embodiment, the fuel gas consumption amount estimation means 524 calculates and estimates the consumption amount of the fuel gas based on the output current Ifc of the fuel cell 100, and the air supply time interval acquisition means 525 acquires, based on the calculated consumption amount of the fuel gas, the time interval of the air blow in a case where the only oxidizing gas required for the intermittent operation is supplied, from the properties f1 with reference to the relationship table 523 in which the relationship between the fuel gas consumption amount and the theoretical air blow time interval is recorded as shown in FIG. 4.

On the other hand, the air supply time interval measuring means 526 actually measures the air blow time interval Td in the cell voltage lowering processing unit 521. When the fuel gas is used only for the intermittent operation, the theoretical air blow time interval Tc estimated from the consumption amount of the fuel gas should match the actually measured actual air blow time interval Td. If cross leak occurs in the electrolyte membrane of the fuel cell, the lowering speed of the cell voltage Vc becomes high, whereby the actually measured air blow time interval Td shortens.

To solve the problem, the degradation judgment means 527 compares the theoretical air blow time interval Tc acquired with reference to the relationship table 523 with the actually measured actual air blow time interval Td to judge whether or not the theoretical air blow time interval Tc is substantially equal to the actual time interval. In the present embodiment, when the actually measured actual air blow time interval Td is in a range of a margin (e.g., the margin m) set with respect to a theoretical air blow time interval Tc1, it is judged that the state of the electrolyte membrane is normal. When the actual time interval is below the theoretical air blow time interval Tc in excess of the margin m, it is judged that the cross leak occurs in the electrolyte membrane. A certain degree of calculative or mechanical error is usually present in the system, and hence such a margin is set, whereby when the actual time interval is within the margin range, it is preferably judged that the time interval is equal to the theoretical time interval. The margin m may appropriately be set in view of the calculative or mechanical error of the system.

When the consumption amount of the fuel gas estimated from the output current of the fuel cell is, for example, M in FIG. 4, it is seen with reference to the relationship properties f1 that Tc1 is the theoretical air blow time interval in a case where it is considered that the air blow is performed only for the intermittent operation.

Now, when the actually measured actual air blow time interval is Td1, the actual air blow time interval Td1 is present in the range of the margin m from the theoretical air blow time interval Tc1. Therefore, it can be judged that the actually measured actual air blow time interval Td1 is a normal value and that the cross leak does not occur in the electrolyte membrane of the cell.

On the other hand, if the actually measured actual air blow time interval is Td2, the actually measured actual air blow time interval Td2 is a short period deviating out of the range of the margin m from the theoretical air blow time interval Tc1. In this case, it is possible to judge the presence of the oxidizing gas lost in excess of the supply amount of the oxidizing gas consumed by the intermittent operation, and hence it can be judged that there is a high possibility that the cross leak occurs in the cell electrolyte membrane.

Moreover, when the actually measured actual air blow time interval Td lengthens in excess of the margin from the theoretical air blow time interval Tc, it can be judged that another abnormality which decreases the oxidizing gas supply amount occurs in addition to the cross leak.

(Judgment Processing in a Case where the High-Potential-Avoiding Processing is Performed)

Furthermore, if a measure for maintaining the function of the fuel cell is also used in addition to the power required for the intermittent operation, the output current of the fuel cell rises, and the consumption amount of the fuel gas increases. If the consumption amount of the fuel gas increases, the supply amount of the oxidizing gas accordingly rises, and the time interval of the air blow accordingly shortens. This is shown in FIG. 3.

When the high-potential-avoiding processing is not performed in FIG. 3, the cell open circuit voltage Vc exceeds a high-potential-avoiding voltage Vth2, and at this time, the air blow time interval is Td1. However, when the high-potential-avoiding processing is performed, the cell open circuit voltage Vc is suppressed within the high-potential-avoiding voltage Vth2, the consumption amount of an oxygen gas increases, and the air blow time interval changes to Td2 which is shorter than Td1.

This will be considered based on FIG. 4. There will be considered, for example, a case where the high-potential-avoiding processing is performed in the high-potential-avoiding processing unit 512, so that the output current of the fuel cell rises, and the consumption amount of the fuel gas increases as much as Δh. In this case, the fuel gas consumption amount estimated based on the output current of the fuel cell by the fuel gas consumption amount estimation means 524 is M+Δh.

At this time, if the theoretical air blow time interval in a case where the consumption amount of the fuel gas is M is fixed at Tc1, the actual time interval Td2, which should originally be judged to be normal, deviates from the margin range, and hence it is erroneously judged that the time interval is abnormal. This will be described with reference to FIG. 3. When the theoretical air blow time interval is set to the fixed value Tc1 in a case where the only intermittent operation is performed, the consumption amount of the fuel gas actually increases, the supply amount of the oxidizing gas accordingly increases, and the air blow time interval accordingly shortens to Td2 as shown by a broken line. However, the erroneous theoretical air blow time interval Tc1 is compared with the actual time interval Td2.

In this respect, according to the present embodiment, the relationship table is used. Therefore, even when the consumption amount of the fuel gas varies, it is possible to correctly acquire the air blow time interval which accordingly varies. That is, the theoretical air supply time interval acquisition means 525 refers to the relationship table 523 by use of the whole fuel gas consumption amount including the high-potential-avoiding processing consumption amount as a reference value, thereby correctly acquiring, as the theoretical air blow time interval, a theoretical time interval Tc2 in a case where the consumption amount of the fuel gas is M+Δh. At this time, when the actually measured air blow time interval is Td2, the time interval Td2 is in the margin range from the actual air blow time interval Tc2 acquired from the relationship table, whereby it is judged that the electrolyte membrane is normal.

By the above processing, the cross leak of the electrolyte membrane can correctly be judged, even when the high-potential-avoiding processing is also used. It is to be noted that such processing is not limited to the high-potential-avoiding processing but can be applied, as long as the measure for maintaining the function of the fuel cell results in the increase of the consumption amount of the fuel gas and the processing is a measure which can calculate the increase amount.

Figure 5:
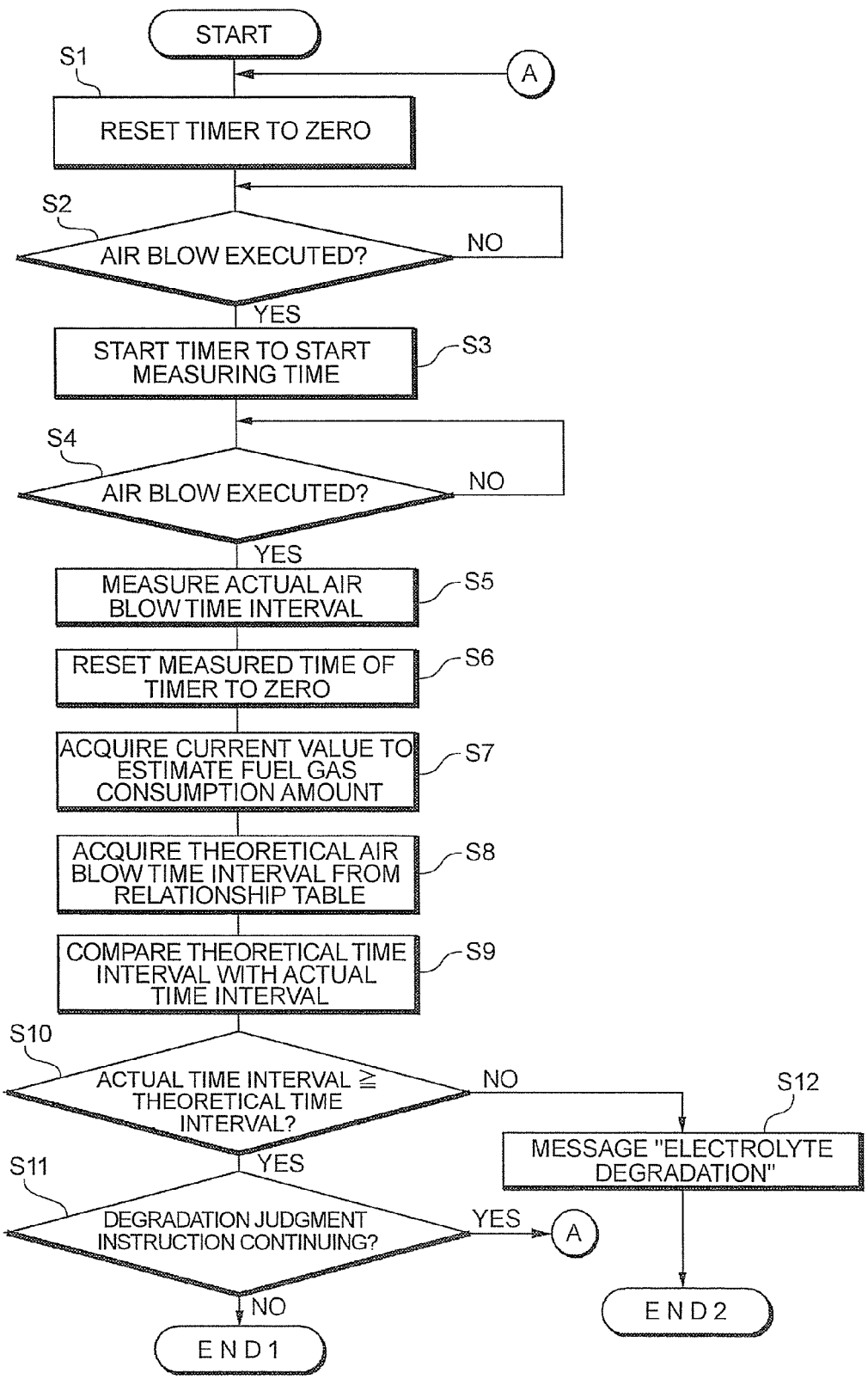
FIG. 5 is a flow chart diagram showing an operation procedure of processing to judge the degradation of an electrolyte in a fuel cell stack of the fuel cell system according to Embodiment 1 of the present invention.

FIG. 5 is a flow chart diagram showing an operation procedure of processing to judge the degradation of the electrolyte in the fuel cell stack of the fuel cell system according to the present embodiment. Hereinafter, the operation of the processing to judge the degradation of the electrolyte in the fuel cell stack of the fuel cell system according to the present embodiment will be described with reference to the flow chart shown in FIG. 5. This processing operation is started when a degradation judgment instruction is issued.

In step S1, the actual air supply time interval measuring means 526 resets a timer to shift to step S2 in which it is judged whether or not there is a notification of the execution of the air blow from the cell voltage lowering prevention processing unit 521. As long as the execution of the air blow is not notified (NO), the actual air supply time interval measuring means 526 is in a standby state.

When the execution of the air blow is notified in the step S2 (YES), the actual air supply time interval measuring means 526 starts the timer in step S3 to start measuring the actual air blow time interval. Subsequently, it is judged in step S4 whether or not there is the notification of the execution of the air blow again. As long as the air blow is not executed (NO), the actual air supply time interval measuring means 526 is in the standby state.

When the execution of the air blow is notified in the step S4 (YES), in step S5, the actual air supply time interval measuring means 526 refers to the measured time of the timer at that time, stores the actual air blow time interval Td, and shifts to step S6 to reset the timer.

In step S7, the fuel gas consumption amount estimation means 524 calculates and estimates the consumption amount of the fuel gas based on the output current Si of the fuel cell.

In step 8, the theoretical air supply time interval acquisition means 525 acquires the corresponding oxidizing gas supply amount, that is, the theoretical air blow time interval Tc from the estimated fuel gas consumption amount with reference to the relationship table 523.

In step S9, the degradation judgment means 527 compares the actual air blow time interval Td with the theoretical time interval Tc, and shifts to step S10.

When the actual air blow time interval Td is not less than the theoretical time interval Tc in the step S10 as the result of the comparison (YES), it can be judged that the cross leak especially does not occur in the electrolyte membrane. Therefore, the processing shifts to step S11.

It is judged in the step S11 whether or not the degradation judgment instruction is continuing. When the degradation judgment instruction is continuing (YES), the processing shifts to the step S1 to measure again the actual air blow time interval at the present time. When the degradation judgment instruction ends (NO), the processing once ends.

On the other hand, when the actual air blow time interval Td is shorter than the theoretical time interval Tc as the result of the comparison in the step S10 (NO), ideally when the actual time interval Td is smaller than a value (=Tc−m) obtained by including the margin m in the theoretical time interval Tc, it can be judged that there is a high probability of the occurrence of the cross leak in the electrolyte membrane. Therefore, the processing shifts to step S12 in which the degradation judgment means 527 executes processing to send a message that the electrolyte degrades and requires maintenance, thereby ending this processing.

As described above, according to Embodiment 1 of the present invention, it is considered that the air blow interval shortens owing to the consumption of hydrogen by the power generation using remaining air during the high-potential-avoiding operation, to judge that the degradation has occurred in the electrolyte of the fuel cell stack, whereby the erroneous judgment of the degradation of the electrolyte can be avoided.

Embodiment 2

Embodiment 2 of the present invention relates to a system which prevents the erroneous judgment of the degradation of an electrolyte membrane when catalyst activation processing is also used.

A constitution of a fuel cell system according to Embodiment 2 of the present invention is the same as the constitution (FIG. 1) of the fuel cell system according to Embodiment 1 described above, a constitution of functional blocks is also the same as the constitution (FIG. 2) of the functional blocks of the fuel cell system according to Embodiment 1 described above, and hence the description thereof is omitted. However, the present embodiment is different only in an actual air blow time interval measuring method of actual air supply time interval measuring means 526 in a degradation judgment unit 522 of a control unit 5.

As described above, when a catalyst activation processing unit 513 performs catalyst activation processing, air blow for maintaining the function of a fuel cell is performed sometimes. This air blow is not frequently performed as compared with high-potential-avoiding processing, but is not concerned with air blow which varies in accordance with the consumption amount of a fuel gas. Therefore, the actual air supply time interval measuring means 526 functions so as to exclude the air blow which occurs in accordance with the catalyst activation processing from the measurement of the actual air blow time interval.

Figure 6:
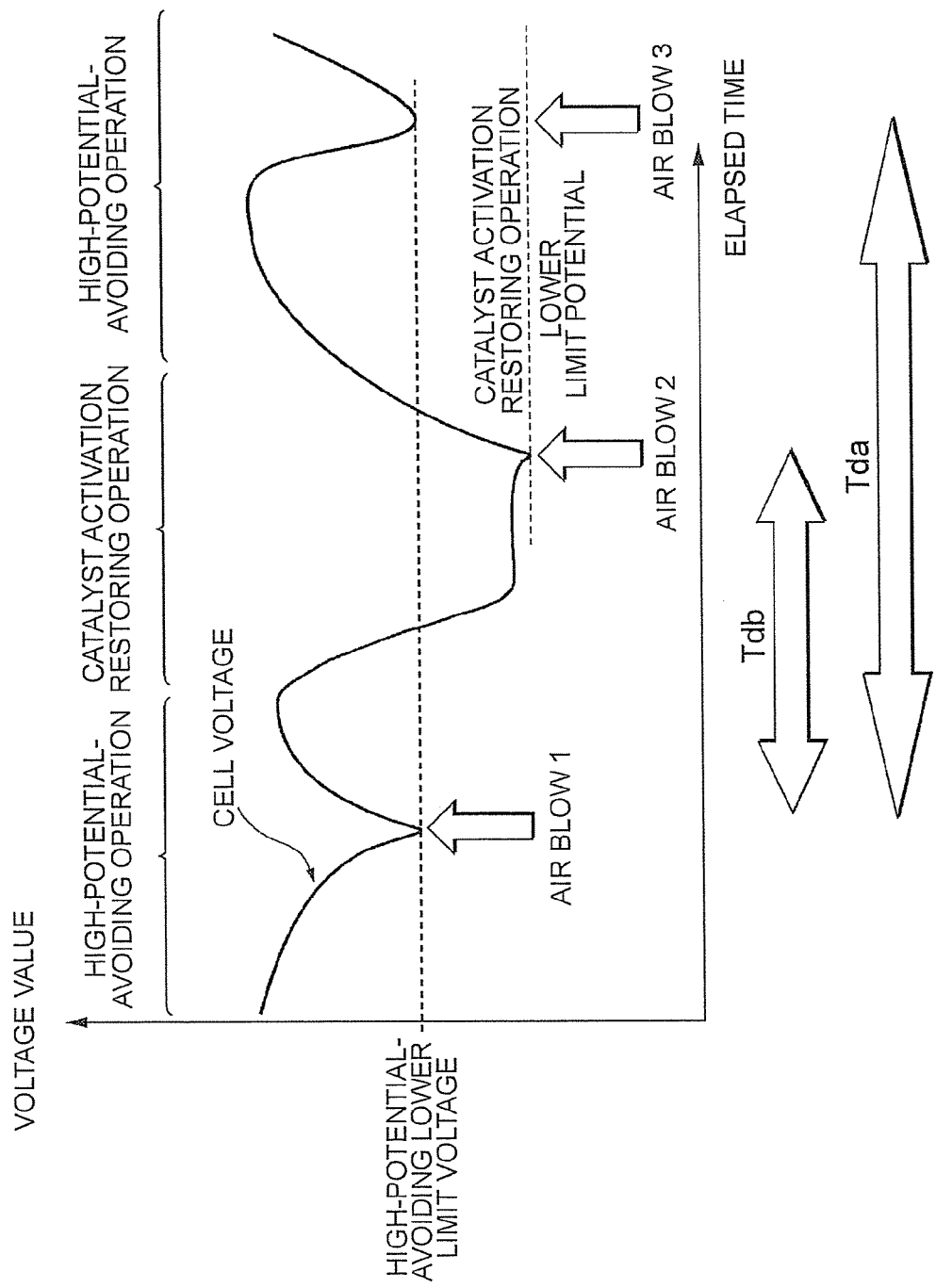
FIG. 6 is a graph diagram showing a relationship between an air blow interval and a cell voltage in a case where catalyst activation processing is performed.

FIG. 6 is a graph diagram showing a relationship between an air blow interval and a cell voltage as reference in a case where the degradation of an electrolyte in a fuel cell stack is detected, including a period of the catalyst activation processing during the high-potential-avoiding processing until the end of the period.

As shown in FIG. 6, periodically in a case where a low efficiency operation such as an intermittent operation is performed, or in a case where it can be judged from a cell voltage Vc or the like that the oxidation of a catalyst of the electrolyte membrane proceeds, the catalyst activation processing unit 513 limits the supply of an oxidizing gas and the fuel gas, gradually lowers the secondary side voltage of a DC-DC converter 41 to a catalyst activation target voltage, and keeps a state where an electrochemical reaction proceeds in a reduction region of the catalyst, to perform the activation of the catalyst (also referred to as refresh). When the catalyst activation target voltage is reached, the catalyst activation processing unit 513 keeps the voltage for a constant time, and then the DC-DC converter 41 is controlled to recover the secondary side voltage to the original voltage. At this time, a compressor 20 is controlled so as to compensate for the oxidizing gas which runs short owing to the catalyst activation processing at this time, thereby supplying a constant amount of an oxidizing gas for a period of time. At this time, the air blow (air blow 2) is apparently different from air blow (air blow 1) performed as a part of cell voltage lowering prevention processing, and is performed to compensate for the oxidizing gas temporarily lost in the catalyst activation processing, thereby recovering the cell voltage.

In degradation judgment processing of the electrolyte membrane according to the present invention, an actual air blow time interval is actually measured. If the air blow 2 to be executed at the end of this catalyst activation processing is performed during the measuring of this actual air blow time interval, the actual air blow time interval is erroneously measured. In, for example, FIG. 6, if the catalyst activation processing is not performed, air blow which should originally be measured after the air blow 1 is air blow 3, and an actual time interval Tda has to be measured. However, when the air blow 2 at the end of the catalyst activation processing is interposed, Tdb (<Tda) might be measured as the actual air blow time interval. When a short time interval is measured as the actual air blow time interval, it might erroneously be judged that cross leak occurs, although the cross leak actually does not occur in the electrolyte membrane.

To solve the problem, in Embodiment 2 of the present invention, the actual air supply time interval measuring means 526 inputs information indicating the presence/absence of the air blow from a catalyst activation processing unit 513. When the air blow at the end of the catalyst activation processing is performed, this air blow is ignored.

Figure 7:
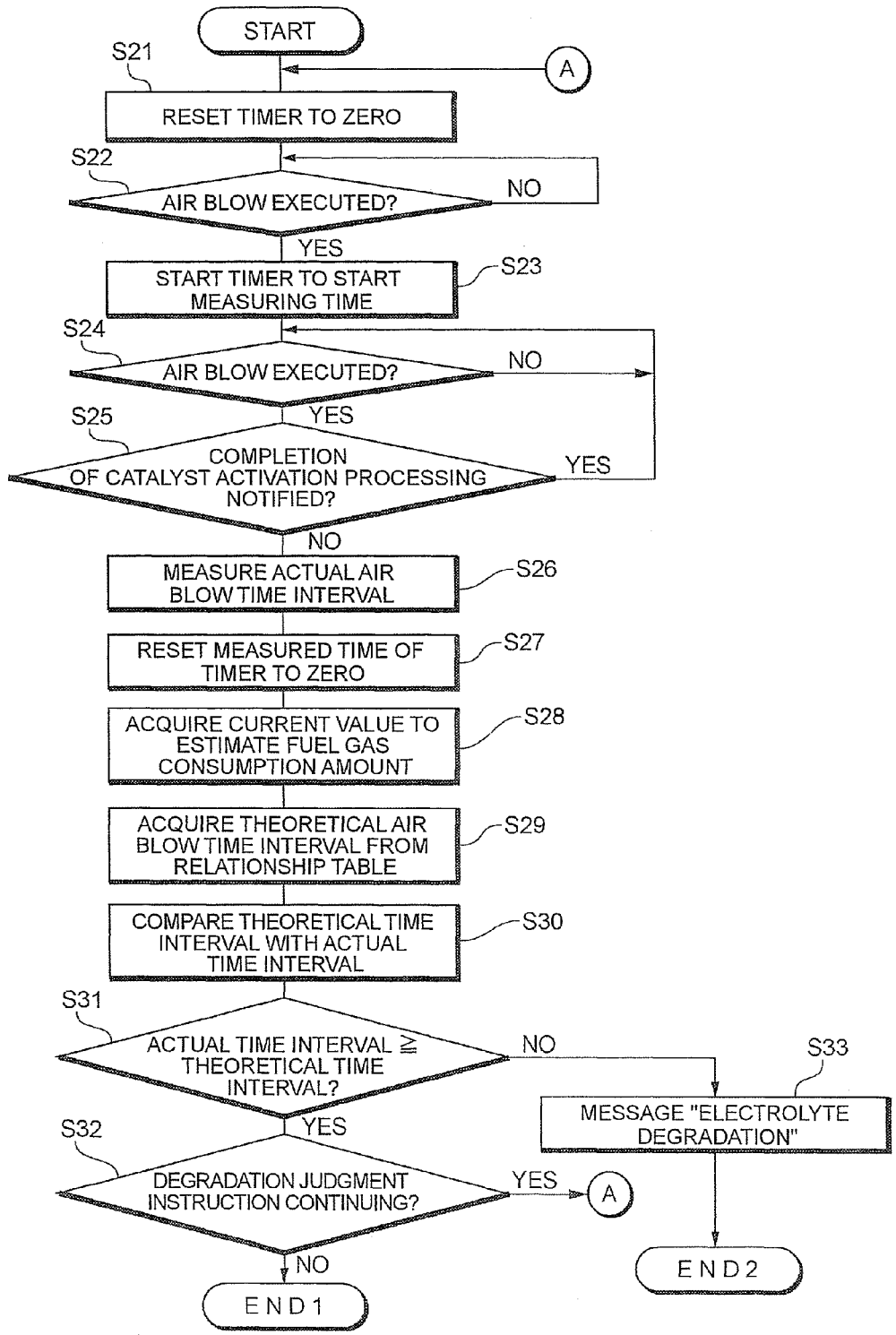
FIG. 7 is a flow chart diagram showing an operation procedure of processing to judge the degradation of an electrolyte in a fuel cell stack of a fuel cell system according to Embodiment 2 of the present invention.

FIG. 7 is a flow chart diagram showing an operation procedure of processing to judge the degradation of the electrolyte in the fuel cell stack of the fuel cell system according to Embodiment 2 of the present invention. This processing operation is started, when a degradation judgment instruction is issued.

In step S21, the actual air supply time interval measuring means 526 resets a timer to shift to step S22 in which it is judged whether or not there is a notification of the execution of the air blow from a cell voltage lowering prevention processing unit 521. As long as the notification of the execution of the air blow is not notified (NO), the actual air supply time interval measuring means 526 is in a standby state.

When the execution of the air blow is notified in the step S22 (YES), the actual air supply time interval measuring means 526 starts the timer in step S23 to start measuring the actual air blow time interval. Subsequently, it is judged in step S24 whether or not there is the notification of the execution of the air blow again. As long as the air blow is not executed (NO), the actual air supply time interval measuring means 526 is in the standby state.

When the execution of the air blow is notified in the step S24 (YES), the actual air supply time interval measuring means 526 judges in step S25 whether or not the completion of the catalyst activation processing is notified from the catalyst activation processing unit 513. The air blow executed at the completion of the catalyst activation processing has to be excluded from the measurement of the above timer.

Therefore, when the completion of the catalyst activation processing is notified in the step S25 (YES), the actual air supply time interval measuring means 526 returns to the step S24. In consequence, the air blow at the completion of this catalyst activation processing is ignored, thereby waiting for the air blow performed based on the next cell voltage lowering prevention processing.

On the other hand, when the completion of the catalyst activation processing is not notified in the step S25 (NO), it can be judged that this air blow is the air blow performed based on cell voltage lowering prevention processing. Therefore, the actual air supply time interval measuring means 526 shifts to step S26 in which an actual air blow time interval Td is stored with reference to the measured time of the timer at that time. Next, the processing shifts to step S27 to reset the timer.

In step S28, fuel gas consumption amount estimation means 524 calculates and estimates the consumption amount of the fuel gas based on an output current Si of the fuel cell, and in step 29, theoretical air supply time interval acquisition means 525 acquires the corresponding oxidizing gas supply amount, that is, a theoretical air blow time interval Tc from the estimated fuel gas consumption amount with reference to a relationship table 523.

Subsequently, in step S30, degradation judgment means 527 compares the actual air blow time interval Td with the theoretical time interval Tc, and shifts to step S31. When the actual air blow time interval Td is not less than the theoretical time interval Tc in the step S31 as the result of the comparison (YES), it can be judged that the cross leak especially does not occur in the electrolyte membrane. Therefore, the processing shifts to step S32.

It is judged in the step S32 whether or not the degradation judgment instruction is continuing. When the degradation judgment instruction is continuing (YES), the processing shifts to the step S21 to measure again the actual air blow time interval at the present time. When the degradation judgment instruction ends (NO), the processing once ends.

On the other hand, when the actual air blow time interval Td is shorter than the theoretical time interval Tc as the result of the comparison in the step S31 (NO), it can be judged that there is a high probability of the occurrence of the cross leak in the electrolyte membrane. Therefore, the processing shifts to step S33 in which the degradation judgment means 527 executes processing to send a message that the electrolyte degrades and requires maintenance, thereby ending this processing.

As described above, according to Embodiment 2 of the present invention, when the catalyst activation processing is executed in parallel, the air blow is performed to compensate for air shortage at the end of the catalyst activation processing, but is excluded from the air blow for measuring the actual time interval, whereby the erroneous judgment of the degradation of the electrolyte can be avoided.

Embodiment 3

Embodiment 3 of the present invention relates to a configuration in which an oxidizing gas amount obtained by subtracting the amount of a reactant gas consumed to maintain a function from the amount of the reactant gas supplied for an intermittent operation is estimated as the amount of cross leak in an electrolyte membrane of a fuel cell.

Figure 8:
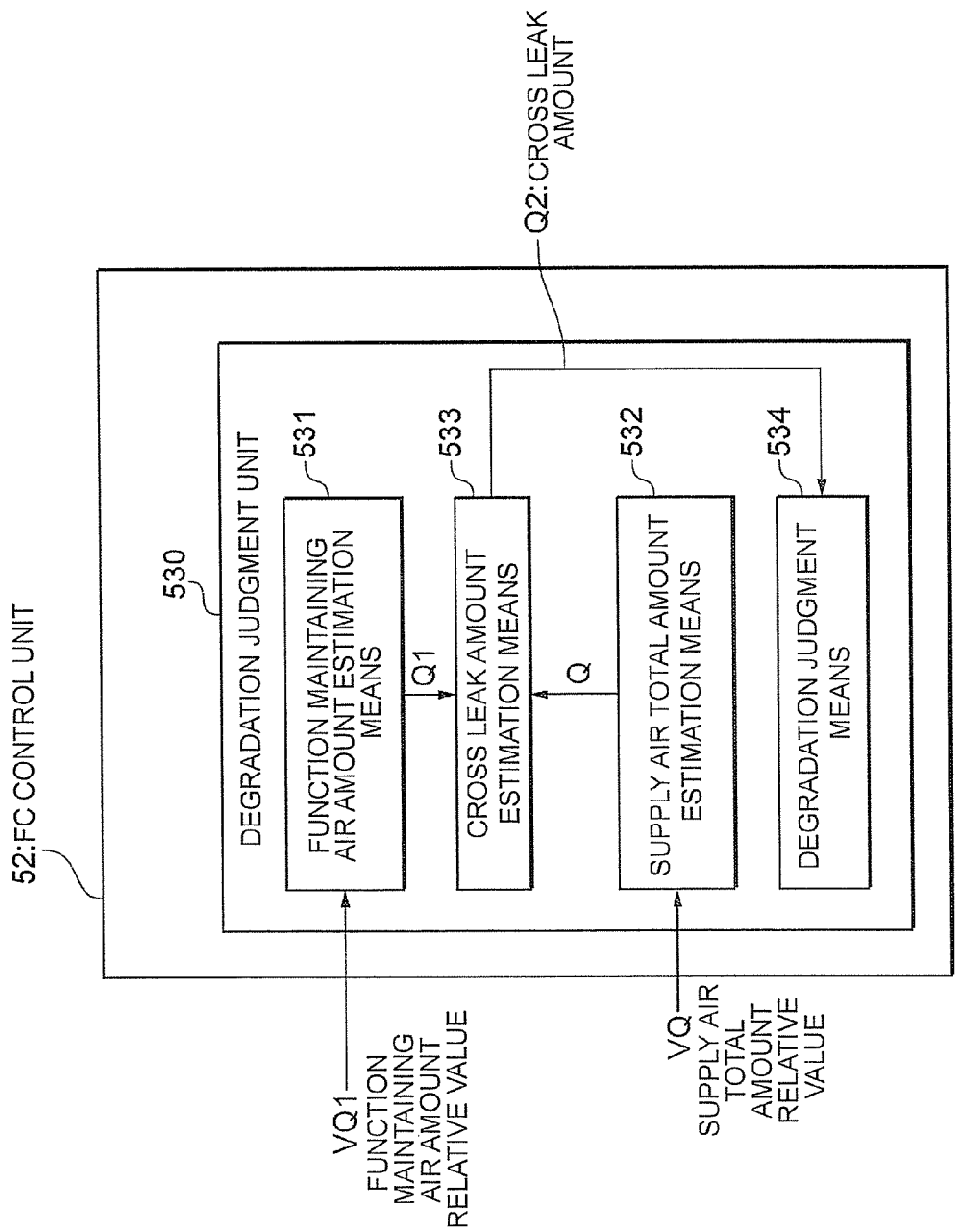
FIG. 8 is a constitution diagram showing a constitution of functional blocks in an FC control unit 52 according to Embodiment 3 of the present invention.

FIG. 8 shows a constitution of functional blocks of a fuel cell system according to Embodiment 3 of the present invention.

As shown in FIG. 8, an FC control unit 52 has a degradation judgment unit 530 of Embodiment 3 of the present invention. The degradation judgment unit 530 comprises function maintaining air amount estimation means 531, supply air total amount estimation means 532, cross leak amount estimation means 533 and degradation judgment means 534. As to functional blocks (a power system control unit 511, a high-potential-avoiding processing unit 512, a catalyst activation processing unit 513 and a cell voltage lowering prevention processing unit 521) described above in Embodiment 1, drawing and description thereof are omitted.

The function maintaining air amount estimation means 531 is a functional block which estimates an air amount Q1 necessary for maintaining the function of the fuel cell system, per unit time, based on a function maintaining air amount relative value VQ1. As described above, the air amount Q1 necessary for maintaining the function of the fuel cell system indicates the amount of air used for a purpose other than a purpose of obtaining a necessary generated power obtained for a system demand, and specifically indicates the total amount of air used for the above high-potential-avoiding processing or catalyst activation processing. Therefore, the function maintaining air amount relative value VQ1 is not limited to a single numeric value, and should be regarded as an integral parameter which represents the amount of the air used for maintaining the function for each function.

For example, when a parameter of the amount of air used for function 1 (e.g., the above high-potential-avoiding processing) is Vq1, a parameter of the amount of air used for function 2 (e.g., the above catalyst activation processing) and a parameter of the amount of air used for function 3 (an arbitrary function) is Vq3, the function maintaining air amount estimation means 531 estimates air amounts q1, q2 and q3 necessary for the respective functions based on the respective parameters Vq1 to Vq3. Moreover, the air amount Q1 necessary for maintaining the function is obtained as follows:

$$Q1 = q1 + q2 + q3 (= \Sigma qn: n \text{ is a function number}).$$

The supply air total amount estimation means 532 is a functional block which obtains a total supply air amount Q per unit time at the present time based on a supply air total amount relative value VQ. As the supply air total amount relative value VQ, various values are considered, but the value may be, for example, the rotation number of a compressor 20, a detected value of the supply pressure of an air compressor, or a detected value of a flow rate sensor, if any, in an oxidizing gas supply path 21. The supply air total amount estimation means 532 calculates the total supply air amount Q from one of the parameters indicating the total amount of the air supplied per unit time at the present time.

The cross leak amount estimation means 533 is a functional block which estimates an air amount Q2 concerning cross leak based on the function maintaining air amount Q1 and the total supply air amount Q. As described above, there is a relationship of $Q \approx Q1 + Q2$ among the total supply air amount Q, the function maintaining air amount Q1 and the cross leak amount Q2 during the intermittent operation. The cross leak amount estimation means 533 outputs a value obtained by subtracting the function maintaining air amount Q1 from the total supply air amount Q as the estimated value of the cross leak amount Q2.

The degradation judgment means 534 is a functional block which judges the presence/absence of the degradation of the electrolyte based on the estimated cross leak amount Q2. For example, a threshold value Qth which can be allowed as the amount of the cross leak occurring in the electrolyte is compared with the estimated cross leak amount Q2. When Q2>Qth, it is judged that the electrolyte degrades, and required notification processing or the like is performed. The change of the electrolyte membrane is suggested.

As described above, according to Embodiment 3 of the present invention, the cross leak amount Q2 is obtained based on the total supply air amount Q and the air amount Q1 required for maintaining the function, and is compared with the threshold value Qth, whereby the degradation of the electrolyte membrane can accurately be grasped.

Another Embodiment

In a fuel cell system according to the above embodiments of the present invention, an actual air blow time interval is acquired by measuring a time between two consecutive air blow operations, but the present invention is not limited to this embodiment. That is, time intervals among a plurality of air blow operations may be measured, and an average value or the like of them may be obtained to use the value for comparison between a theoretical air blow time interval and an actual air blow time interval. When the average of the plurality of actual time intervals or the like is used, the precision of the actual time interval improves, whereby it is considered that the degradation of an electrolyte membrane is preferably correctly judged.

Moreover, in the fuel cell system according to the above embodiments of the present invention, the cross leak judgment during the intermittent operation is an object, but the present invention can be applied to the cross leak judgment during normal power generation. For example, when an amount Q3 of air consumed for the power generation can be estimated during the normal power generation, a relationship of $Q \approx Q1+Q2+Q3$ is established during the intermittent operation among the total supply air amount Q, the function maintaining air amount Q1, the cross leak amount Q2 and a power generating air amount Q3. Therefore, the function maintaining air amount Q1 and the power generating air amount Q3 are subtracted from the total supply air amount Q, whereby the cross leak amount Q2 can be obtained. The power generating air amount Q3 can be calculated from equation (2) by detecting, for example, the power generation current (the amount of charge per unit time).

In other words, if any cross leak does not occur, a total reactant gas amount Qd actually measured in a state where the power generation voltage is kept should be equal to a total reactant gas amount Qe estimated from various parameters. Therefore, when a difference Qd (=Qr−Qe) between both the amounts is not zero (>0), the difference Qd can be used as the cross leak amount in the judgment of the degradation.

Moreover, the fuel cell system according to the above embodiments of the present invention can be applied to mobile bodies (on land, on water, in water and in air) other than an electric car, and can be applied to a stationary system.

The invention claimed is:

1. A fuel cell system comprising:
a fuel cell control unit, the fuel cell unit programmed to:
perform a cell voltage lowering prevention processing to supply a predetermined amount of oxidizing gas to a cathode of a fuel cell when a cell voltage of the fuel cell is below a predetermined lower limit voltage,
and judge degradation of an electrolyte membrane of the fuel cell based on an amount of oxidizing gas supplied to the fuel cell during a low efficiency operation in which reactant gas is supplied at predetermined intervals,
wherein the fuel cell control unit is programmed to judge that the electrolyte membrane of the fuel cell is degraded when an actually measured amount of oxidizing gas supplied to the cathode of the fuel cell is larger than an estimated amount of oxidizing gas supplied to the cathode, and
wherein the fuel cell control unit is programmed to estimate the estimated amount being estimated from an output current of the fuel cell.

2. The fuel cell system according to claim 1, the estimated oxidizing gas amount including an amount of the oxidizing gas consumed for the cell voltage lowering prevention processing.

3. The fuel cell system according to claim 1, the estimated oxidizing gas including an amount of the oxidizing gas consumed for high-potential-avoiding processing to prevent an output voltage of the fuel cell from rising to a value which is not less than a predetermined threshold value.

4. The fuel cell system according to claim 1, the actually measured oxidizing gas amount being measured with exclusion of an amount of the oxidizing gas supplied when ending a catalyst activation processing of the electrolyte membrane.

5. The fuel cell system according to claim 1, further comprising:
a device for supplying a predetermined amount of an oxidizing gas to the cathode of the fuel cell when a cell voltage of the fuel cell reaches a predetermined lower limit voltage;
a device that acquires an estimated time interval from an end of supply of the oxidizing gas to a start of the next supply of the oxidizing gas, the estimated time interval being estimated from an output current of the fuel cell;
a device that measures an actual time interval from the end of the supply of the oxidizing gas to the start of the next supply of the oxidizing gas; and
wherein the fuel cell control unit is programmed to judge that the electrolyte membrane of the fuel cell is degraded when the measured actual time interval is shorter than the acquired estimated time interval with a degradation judgment device.

6. The fuel cell system according to claim 5, wherein the device that measures the actual time interval of the supply of the oxidizing gas measures the actual time interval with exclusion of supply of the oxidizing gas immediately after a catalyst activation processing of the electrolyte membrane from supply of the oxidizing gas performed a plurality of times.

7. The fuel cell system according to claim 5, wherein the device that acquires the estimated time interval comprises a relationship table which contains a record of a relationship between a consumption amount of a fuel gas of the fuel cell and the estimated time interval varying with increase of the consumption amount of the fuel gas;
the fuel cell system further comprising:
a device that estimates the consumption amount of the fuel gas based on an output current of the fuel cell; and
a device that acquires the estimated time interval corresponding to the consumption amount of the fuel gas estimated with reference to the relationship table,
wherein the degradation judgment device judges that the electrolyte membrane of the fuel cell is degraded when the measured actual time interval is shorter than the estimated time interval corresponding to the acquired consumption amount of the fuel gas.

* * * * *

UNITED STATES PATENT AND TRADEMARK OFFICE
CERTIFICATE OF CORRECTION

PATENT NO. : 8,728,677 B2  Page 1 of 1
APPLICATION NO. : 12/809310
DATED : May 20, 2014
INVENTOR(S) : Yoshida et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 535 days.

Signed and Sealed this

Twenty-ninth Day of September, 2015

Michelle K. Lee
*Director of the United States Patent and Trademark Office*